(12) United States Patent
Dong

(10) Patent No.: US 8,091,923 B2
(45) Date of Patent: Jan. 10, 2012

(54) ADAPTIVE SEAT BELT LOAD LIMITER AND METHOD

(75) Inventor: Ke Dong, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 706 days.

(21) Appl. No.: 12/147,533

(22) Filed: Jun. 27, 2008

(65) Prior Publication Data

US 2009/0326765 A1 Dec. 31, 2009

(51) Int. Cl.
*B60R 22/28* (2006.01)

(52) U.S. Cl. ......................................... 280/805; 297/472

(58) Field of Classification Search .................. 280/805, 280/806; 297/470, 471, 479; 701/45
See application file for complete search history.

(56) References Cited

U.S. PATENT DOCUMENTS

| | | | | |
|---|---|---|---|---|
| 3,026,972 A | | 3/1962 | Hendry | 188/1 |
| 3,308,908 A | * | 3/1967 | Bunn | 188/374 |
| 3,680,913 A | | 8/1972 | Seybold | 297/386 |
| 3,973,650 A | * | 8/1976 | Nagazumi | 188/371 |
| 4,258,934 A | * | 3/1981 | Tsuge et al. | 280/806 |
| 4,886,296 A | * | 12/1989 | Brodmann | 280/805 |
| 4,978,139 A | * | 12/1990 | Andres et al. | 280/805 |
| 5,069,482 A | | 12/1991 | Fohl | 280/801 |
| 5,431,447 A | | 7/1995 | Bauer | 280/805 |
| 5,580,091 A | * | 12/1996 | Doty | 280/805 |
| 5,664,807 A | | 9/1997 | Bohmier | 280/805 |
| 5,971,489 A | | 10/1999 | Smithson | 297/472 |
| 6,056,320 A | * | 5/2000 | Khalifa et al. | 280/805 |
| 6,135,564 A | | 10/2000 | Wier | 297/472 |
| 6,199,954 B1 | * | 3/2001 | Holzapfel | 297/479 |
| 6,299,211 B1 | | 10/2001 | Wier | 280/806 |
| 6,425,542 B2 | * | 7/2002 | Huber | 242/379.1 |
| 6,712,394 B2 | | 3/2004 | Betz | 280/805 |
| 7,137,648 B2 | | 11/2006 | Schulz | 280/805 |
| 7,784,831 B2 | * | 8/2010 | Dong | 280/805 |
| 7,997,620 B1 | * | 8/2011 | Dong et al. | 280/801.2 |
| 2009/0005935 A1 | * | 1/2009 | Lenning | 701/45 |

FOREIGN PATENT DOCUMENTS

| | | |
|---|---|---|
| DE | 23 01 506 A | 8/1973 |
| DE | 298 20 543 U1 | 6/1999 |
| DE | 10 2006 034 582 A1 | 12/2008 |
| SE | 9000168 | 7/1991 |
| WO | WO02087931 | 10/2002 |
| WO | WO 02/ 87 931 A1 | 11/2002 |

* cited by examiner

*Primary Examiner* — Toan C To
*Assistant Examiner* — Barry Gooden, Jr.

(57) ABSTRACT

Method and apparatus for limiting the load on a seat belt buckle, includes providing an adjustable energy absorbing device mounting the seat belt buckle on the vehicle, sensing vehicle and occupant conditions to determine the optimal adjustment of the adjustable energy absorbing device for restraint of the occupant under the sensed conditions, and adjusting the adjustable energy absorbing device in response to the sensed conditions to thereby adapt the restraint of the occupant to the sensed conditions. The adjustable energy absorbing device is an extendable strut having an end connected to the buckle and an end connected to the vehicle, said strut having metal deforming elements therein being deformed upon the load reaching a certain magnitude, and said strut having an adjusting mechanism adjusting the metal deforming elements to adjust the degree of metal deformation and thereby adjust the energy absorbing capacity of the strut.

10 Claims, 2 Drawing Sheets

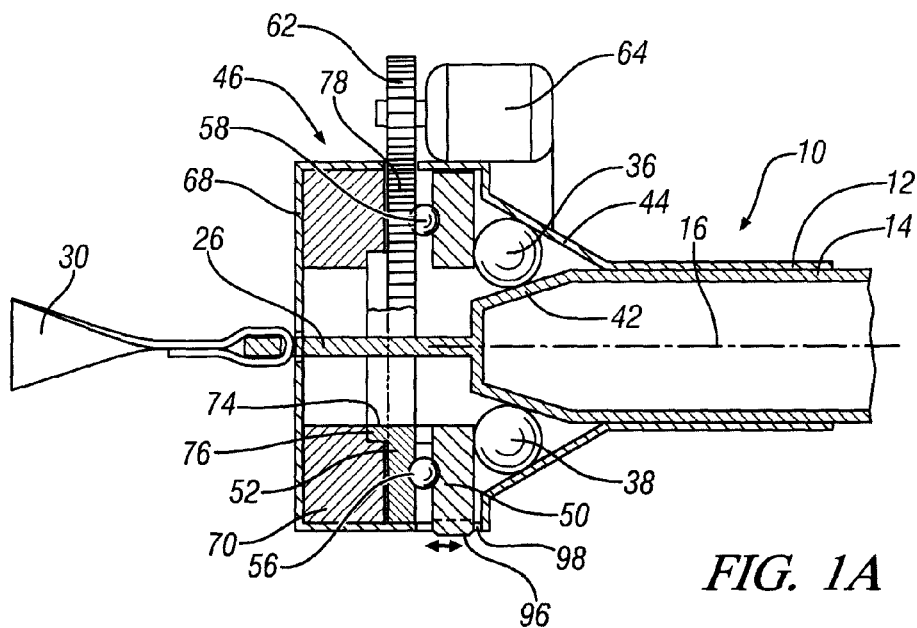
*FIG. 1A*
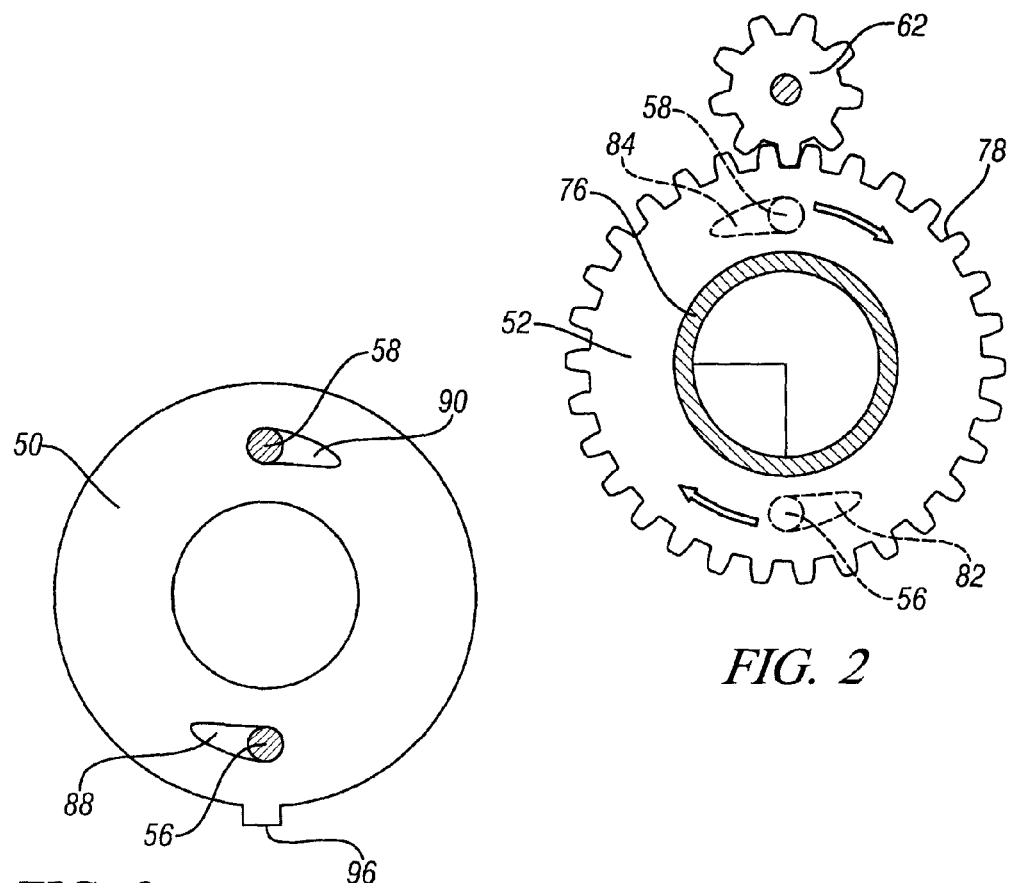
*FIG. 2*
*FIG. 3*

ADAPTIVE SEAT BELT LOAD LIMITER AND METHOD

FIELD OF THE INVENTION

The present invention relates to a device and method for limiting the load imposed upon a seated occupant by a seat belt, and more particularly provides an energy-absorbing load limiter which is adjusted in response to sensed conditions to precisely adapt the load limitation to the needs of the occupant.

BACKGROUND OF THE INVENTION

It is well known in motor vehicles to provide a seat belt system in which a lap belt and a shoulder belt wrap around the occupant and are connected to the vehicle body or the vehicle seat by a seat belt buckle. Upon loading of the occupant against the seat belt, the forward excursion of the occupant is limited by the restraint of the seat belt. It has been proposed in the prior art to limit the load experienced by the occupant by providing a load limiting device in the connection between the seat belt buckle and the vehicle. It would be desirable, however, to provide a load limiting device which would be adjustable to more precisely adjust the load limiting threshold to the needs of a particular occupant, depending on the variables such as vehicle speed and occupant weight.

SUMMARY OF THE INVENTION

According to the invention, a method and apparatus for limiting the load on a seat belt buckle, includes providing an adjustable energy absorbing device mounting the seat belt buckle on the vehicle, sensing vehicle and occupant conditions to determine the optimal adjustment of the adjustable energy absorbing device for restraint of the occupant under the sensed conditions, and adjusting the adjustable energy absorbing device in response to the sensed conditions to thereby adapt the restraint of the occupant to the sensed conditions. The adjustable energy absorbing device is an extendable strut having an end connected to the buckle and an end connected to the vehicle, the strut having metal deforming elements therein being deformed upon the load reaching a certain magnitude, and the strut having an adjusting mechanism adjusting the metal deforming elements to adjust the degree of metal deformation and thereby adjust the energy absorbing capacity of the strut.

Further areas of applicability of the invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings.

FIG. 1A is a view similar to FIG. 1 but showing that the adjusting mechanism has adjusted the position of the device to determine the extent of metal deformation and energy absorption by the load limiting device.

FIG. 2 is a section view taken in the direction of arrows 2-2 of FIG. 1.

FIG. 3 is a section view taken in the direction of arrows 3-3 of FIG. 1.

DETAILED DESCRIPTION OF THE EXEMPLARY EMBODIMENTS

Figure 1:
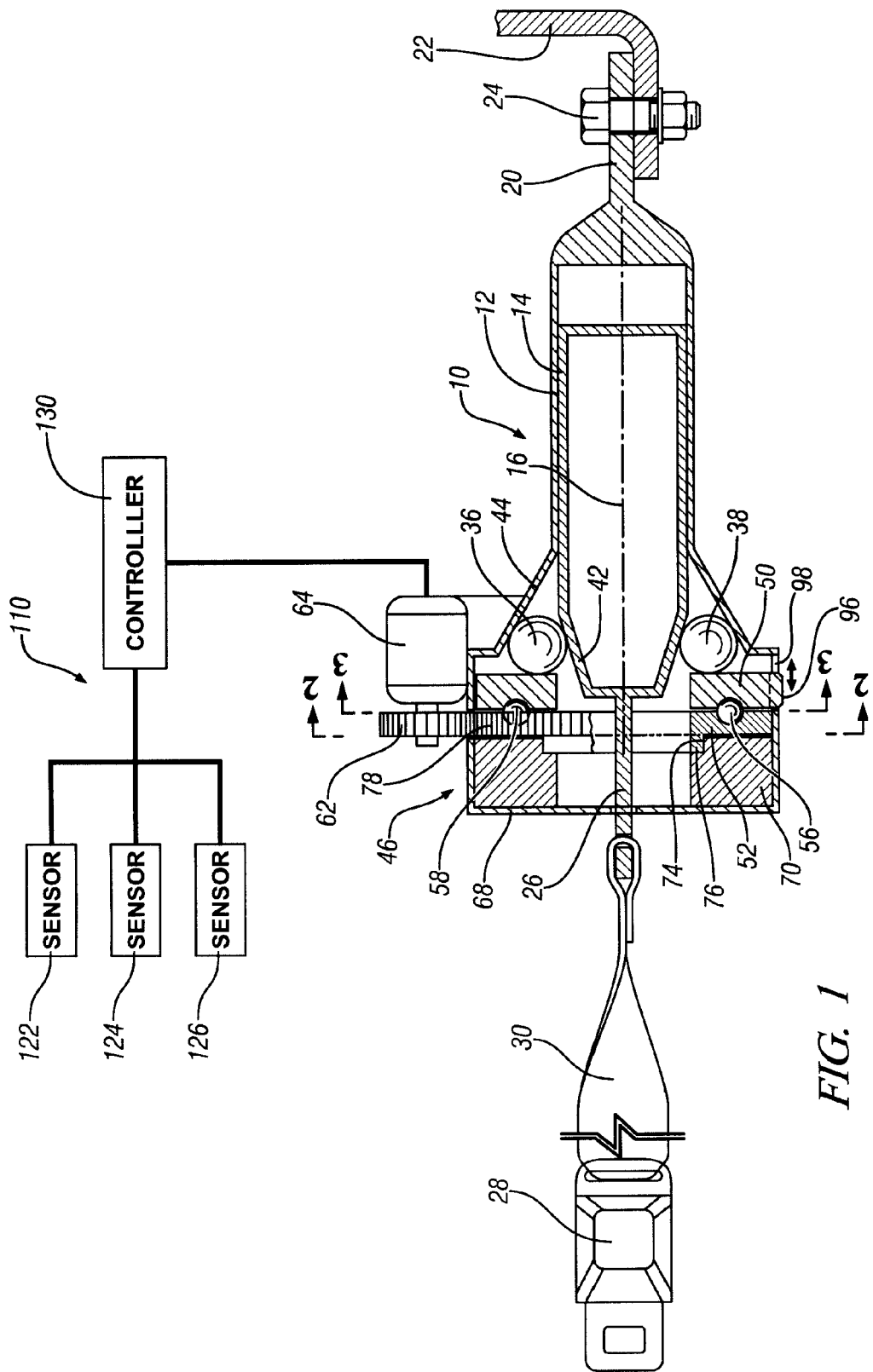
FIG. 1 is a side elevation view of the load limiting device having parts broken away and in section.

The following description of certain exemplary embodiments is merely exemplary in nature and is not intended to limit the invention, its application, or uses.

Referring to FIG. 1, the load limiter device generally indicated at 10 is provided for mounting a seat belt buckle 28 on a vehicle generally indicated at 22.

The load limiter device 10 includes a first tubular member 12 and a second tubular member 14 that is concentric with a central axis 16 of the first tubular member 12 and is slidable therein to form an extendible strut. The first tubular member 12 is thus an outer tubular member and the second tubular member 14 is an inner tubular member, and these tubular members are telescopically arranged for movement therebetween. The first tubular member 12 has a leg 20 that is attached to either the seat or a body panel of the vehicle 22 by a bolt 24. The second tubular member 14 has a leg 26 that is attached to the seat belt buckle 28 by a fabric strap 30. Accordingly, when the seat belt buckle 28 is urged leftwardly by an occupant restraining force, the second tubular member 14 will travel leftwardly within the first tubular member 12.

A pair of plow members or shoes 36 and 38 are captured between a conical ramp portion 42 of the second tubular member 14 and a conical ramp portion 44 of the first tubular member 12 so that the plow members 36 and 38 are positioned to interfere with the leftward travel of the second tubular member 14. The plow members 36 and 38 are shown as round balls but can be of other shapes. The plow members 36 and 38 are held in place, and adjusted in position by an adjusting mechanism, generally indicated at 46, as shown in the drawings.

In particular, the adjusting mechanism 46 includes an actuator plate 50, a gear plate 52, a pair of balls 56 and 58, a drive gear 62 and a motor 64. The adjusting mechanism 46 is housed within a housing 68 provided on the first tubular member 12. A bearing plate 70 of the housing 68 has a journal 74 that receives a hub 76 of the gear plate 52. The gear plate 52 has teeth 78 that mesh with the drive gear 62 of the motor 64. As best seen in FIGS. 2 and 3, the balls 56 and 58 are captured within tear-shaped recesses 82 and 84 of the gear plate 52, and tear-shaped recesses 88 and 90 of the actuator plate 50. The actuator plate 50 has a depending leg 96 that is captured in a slot 98 of the housing 68 so that the actuator plate 50 cannot rotate.

Accordingly, rotation of the gear plate 52 will drive the balls 56 and 58 to move the actuator plate 50 either to the right or the left as viewed in FIG. 1. Moving the actuator plate 50 to the right, as shown in FIG. 1A, will force the plow shoes 36 and 38 down the ramp portion 44 of the first tubular member 12, thereby moving the plow shoes 36 and 38 closer to the central axis 16 and positioning the plow shoes 36 and 38 for a greater degree of interference with the second tubular member 14. Although not shown in the drawings, it may be desirable to mount the plow shoes 36 and 38 within a housing to keep the plow shoes spaced apart around the circumference of the tubular members. Also it may be desirable to provide grooves or depressions in the tubular members to space and position the plow shoes.

Referring again to FIG. 1, a control system generally indicated at 110 is provided for operating the motor 64. The control system 110 includes a plurality of sensors 122, 124 and 126 for sensing various conditions. These sensors can sense conditions such as vehicle speed, occupant weight, occupant position, seat position, or other operating variables. These sensors provide inputs to a controller 130 that will operate the motor 62 in response to the conditions sensed by the sensors 122, 124 and 126.

In operation, it will be understood that upon loading of the seat belt buckle 28 by an occupant restraint load, the buckle 28, acting through the strap 30 will urge the second tubular member 14 leftwardly as viewed in FIG. 1. When the restraint load reaches a certain magnitude, the plow shoes 36 and 38 will begin to plow into the second tubular member 14, creating grooves via the deformation of the metal of the second tubular member 14 as the second tubular member 14 travels to the left, toward the occupant. Accordingly, by virtue of the deformation of metal during the leftward travel of the second tubular member 14, the maximum load imposed on the buckle 28 can be limited as determined by the extent of energy absorption occurring as a result of the deformation of the metal. The magnitude of the energy absorption is thus adjusted by the adjusting mechanism 46 in order to position the plow shoes 36 and 38 for greater or lesser interference with the leftward travel of the second tubular member 14. Thus, the load limiter 10 is an extendible strut, and the length of the strut increases as the second tubular member 14 travels to the left during the restraint of the occupant and energy is absorbed by deformation of the second of the tubular member 14. The leftward travel of the inner tube 14 may be limited by the provision of a stop. For example, the housing 68 can be engaged by the left-hand end of the inner tube 14 to stop the leftward travel. Or the right-hand end of the inner tube 14 can have thickened material that withstands deformation by the plow shoes 36 and 38 to bring the inner tube to a stop.

Upon the startup of the vehicle, and during operation of the vehicle, the load limiting device 10 can be continuously or periodically adjusted by the sensors and the controller to adapt the load limiting device 10 to the restraint needs of the particular occupant under the then existing operating conditions of the vehicle. The load limiting device is replaced after the occurrence of an event that has resulted in deformation of the tubular members.

It will be understood that the particular load limiting device 10 shown herein is just one example of a load limiting device for use in practicing the method of this invention. Another load limiting device is shown in my co-pending patent application, U.S. application Ser. No. 12/147,537 filed Jun. 27, 2008, now U.S. Pat. No. 7,784,831, issued Aug. 31, 2010.

Thus, it is seen that the invention provides a load limiting device and method by which the restraint load imposed upon a seated occupant is adapted and tailored to the particular needs of the seated occupant, depending on the operating variables, for example vehicle speed, occupant weight, etc. The load limiting device is an extendible strut that extends in length via metal deformation, and can be continuously adjusted at intervals during the driving of the vehicle, so that, upon the occurrence of an occupant restraining event, the load limiting device is ready for providing optimal restraint of the particular occupant.

What is claimed is:

1. A load limiter for mounting a seat belt buckle comprising:
   a vehicle tube connected to a vehicle and a buckle tube connected to a buckle, said tubes being concentrically arranged with one tube inside the other tube;
   at least one plow shoe captured between the tubes and upon imposition of an occupant restraint load, the buckle tube moves axially relative the vehicle tube so that the at least one plow shoe deforms at least one of the tubes;
   and an adjuster mechanism adjusting a position of the at least one plow shoe to thereby establish an extent of the deformation of the at least one tube and thereby selectively increasing or decreasing an energy absorbing capacity of the load limiter.

2. The load limiter of claim 1 further comprising a plurality of sensors for sensing conditions, a controller, and an electric actuator cooperating to operate the adjuster mechanism.

3. The load limiter of claim 1 further comprising the at least one plow shoe being a plurality of plow shoes captured between the tubes.

4. The load limiter of claim 3 further comprising the plurality of plow shoes being a plurality of round balls.

5. The load limiter of claim 1 further comprising said adjusting mechanism including an actuator plate for moving the at least one plow shoe into a position of greater or lesser degree of interference with travel of the buckle tube.

6. The load limiter of claim 5 further comprising an electric actuator for actuating the actuator plate and said electric actuator being operated by a controller in response to sensed conditions indicative of a need for adjustment for a restraint of the occupant under the sensed conditions.

7. The load limiter of claim 6 further comprising said electric actuator being an electric motor and a gear mechanism being operated by the electric motor for actuating the actuator plate.

8. A load limiter for mounting a seat belt buckle comprising:
   a first tube connected to a vehicle;
   a second tube connected to a buckle;
   at least one ball captured between the tubes and upon imposition of an occupant restraint load, the second tube moves axially relative the first tube so that the at least one ball deforms the second tube;
   and an adjuster mechanism adjusting a position of the at least one ball to thereby establish an extent of the deformation of the second tube and thereby selectively increasing or decreasing the energy absorbing capacity of the load limiter;
   an electric actuator for operating the adjuster mechanism;
   a plurality of sensors sensing conditions from which can be determined a need for increasing or decreasing the energy absorbing capacity of the load limiter device;
   and a controller for controlling the electric actuator in response to the sensed conditions.

9. The load limiter of claim 8 further comprising the electric actuator being an electric motor.

10. The load limiter of claim 9 further comprising said adjuster mechanism including a gear plate rotated by the electric motor, and an actuator plate for moving the at least one ball relative to the second tube to thereby establish the extent of the deformation of the second tube.

* * * * *